United States Patent
Mataigne et al.

(10) Patent No.: US 10,550,458 B2
(45) Date of Patent: Feb. 4, 2020

(54) METHOD FOR PRODUCING A COATED METAL STRIP HAVING AN IMPROVED APPEARANCE

(71) Applicant: ArcelorMittal, Luxembourg (LU)

(72) Inventors: Jean-Michel Mataigne, Senlis (FR); Luc Diez, Metz (FR)

(73) Assignee: ARCELORMITTAL, Luxembourg (LU)

( * ) Notice: Subject to any disclaimer, the term of this patent is extended or adjusted under 35 U.S.C. 154(b) by 0 days.

(21) Appl. No.: 15/703,930

(22) Filed: Sep. 13, 2017

(65) Prior Publication Data

US 2018/0002798 A1    Jan. 4, 2018

Related U.S. Application Data

(62) Division of application No. 12/919,097, filed as application No. PCT/FR2009/000560 on May 14, 2009, now Pat. No. 9,914,992.

(30) Foreign Application Priority Data

May 14, 2008    (EP) .................................... 08290450

(51) Int. Cl.
| | |
|---|---|
| C23C 2/06 | (2006.01) |
| C23C 26/00 | (2006.01) |
| C23C 2/04 | (2006.01) |
| C23C 2/26 | (2006.01) |
| B32B 15/04 | (2006.01) |
| B32B 15/18 | (2006.01) |
| B32B 15/01 | (2006.01) |
| B32B 15/20 | (2006.01) |
| C23C 2/00 | (2006.01) |
| C23C 30/00 | (2006.01) |

(52) U.S. Cl.
CPC ............... *C23C 2/06* (2013.01); *B32B 15/01* (2013.01); *B32B 15/012* (2013.01); *B32B 15/04* (2013.01); *B32B 15/18* (2013.01); *B32B 15/20* (2013.01); *C23C 2/00* (2013.01); *C23C 2/04* (2013.01); *C23C 2/26* (2013.01); *C23C 26/00* (2013.01); *C23C 30/00* (2013.01); *C23C 30/005* (2013.01); *Y10T 428/1241* (2015.01); *Y10T 428/12229* (2015.01); *Y10T 428/12792* (2015.01); *Y10T 428/12799* (2015.01); *Y10T 428/12972* (2015.01); *Y10T 428/12979* (2015.01); *Y10T 428/12993* (2015.01)

(58) Field of Classification Search
CPC .... C23C 2/06; C23C 2/00; C23C 2/26; C23C 2/04; C23C 26/02
See application file for complete search history.

(56) References Cited

U.S. PATENT DOCUMENTS

| | | | | |
|---|---|---|---|---|
| 4,252,866 | A | * 2/1981 | Matsudo | .................. C25D 5/10 205/176 |
| 4,369,211 | A | * 1/1983 | Nitto | ......................... C23C 2/26 427/349 |
| 4,448,748 | A | 5/1984 | Radtke et al. | |
| 6,797,411 | B2 | 9/2004 | Sodani et al. | |
| 7,534,502 | B2 | 5/2009 | Honda et al. | |
| 9,181,614 | B2 | 11/2015 | Diez et al. | |
| 2003/0219621 | A1 | 11/2003 | Sodani et al. | |
| 2004/0258949 | A1* | 12/2004 | Honda | ................. B32B 15/013 428/659 |
| 2005/0123786 | A1 | 6/2005 | Honda et al. | |
| 2011/0111255 | A1 | 5/2011 | Diez et al. | |
| 2012/0052206 | A1 | 3/2012 | Diez et al. | |

FOREIGN PATENT DOCUMENTS

| | | |
|---|---|---|
| BE | 1003440 | 3/1992 |
| CN | 1161383 A | 10/1997 |
| CN | 1612947 A | 5/2005 |
| EP | 1466994 A1 | 10/2004 |
| GB | 2110248 A | 6/1983 |

(Continued)

OTHER PUBLICATIONS

"Measurement of the wavines characteristic value Wsa (1-5) on the cold rolled metallic flat products", Sep. 1941, 1.st edition, May 2012.

(Continued)

*Primary Examiner* — Dah-Wei D. Yuan
*Assistant Examiner* — Nga Leung V Law
(74) *Attorney, Agent, or Firm* — Davidson, Davidson & Kappel, LLC

(57) ABSTRACT

A process for manufacturing a coated metal strip having a metallic corrosion protection coating is provided. The process includes passing a metal strip through a molten metal bath comprising from 2 to 8 wt % aluminum, 0 to 5 wt % magnesium, up to 0.3 wt % additional elements, and a balance including zinc and inevitable impurities, to yield a molten metal coated metal strip, wiping the molten metal coated metal strip with a nozzle spraying a gas on either side of the molten metal coated metal strip and cooling the coating in a controlled manner until the coating has completely solidified, to obtain the coated metal strip. A temperature of the molten metal bath is from 350 to 700° C., and the cooling is conducted at a rate less than 15° C./s between a temperature on leaving a unit where the wiping occurs and a start of solidification of the coating, and then at a rate greater than or equal to 15° C./s between a start and an end of solidification of the coating.

16 Claims, No Drawings

(56) References Cited

FOREIGN PATENT DOCUMENTS

| JP | H02175007 | | | 7/1990 | | |
|---|---|---|---|---|---|---|
| JP | H02175852 | A | * | 7/1990 | | |
| JP | H02175852 | A | | 7/1990 | | |
| JP | 6158257 | | | 6/1994 | | |
| JP | H11140615 | A | | 5/1999 | | |
| JP | 2001152304 | A | | 6/2001 | | |
| JP | 2002173753 | A | | 6/2002 | | |
| JP | 2003013194 | A | | 1/2003 | | |
| JP | 2003147500 | A | | 5/2003 | | |
| JP | 2003268519 | A | | 9/2003 | | |
| JP | 2004-277876 | A | | 10/2004 | | |
| JP | 2012526916 | A | | 11/2012 | | |
| RU | 2295584 | C1 | | 3/2007 | | |
| WO | 0233141 | A1 | | 4/2002 | | |
| WO | WO-2006002843 | A1 | * | 1/2006 | ............... | C23C 2/06 |

OTHER PUBLICATIONS

Surftest (Surface Roughness Testers), downloaded from www.mitutoto.co.jp on Oct. 19, 2013, 2 pages.
Machine Translation, Tada et al., JP 2004-277876, Oct. 2004.
English abstract of JPH11140615 (May 25, 1999).
English abstract of JP2002173753 (Jun. 21, 2002).
English abstract of JPH02175852 (Jul. 9, 1990).
English abstract of JP2003147500 (May 21, 2003).

* cited by examiner

METHOD FOR PRODUCING A COATED
METAL STRIP HAVING AN IMPROVED
APPEARANCE

The invention relates to a process for manufacturing a metal strip of improved appearance, more particularly intended to be used for the manufacture of skin parts for terrestrial motor vehicles, without however being limited thereto.

BACKGROUND

Steel sheet intended for the manufacture of terrestrial motor vehicle parts are generally coated with a zinc-based metallic coating, for corrosion protection, deposited either by hot-dip coating in a zinc-based liquid bath or by electrodeposition in an electrolytic bath containing zinc ions.

Galvanized sheet intended for the manufacture of skin parts are then formed and assembled, so as to form a body in white, which is then coated with at least one paint coat, thereby providing greater corrosion protection and a good surface appearance.

For this purpose, conventionally, motor vehicle manufacturers firstly apply a cataphoretic coat to the body in white, followed by a primer paint coat, a base paint coat and, optionally, a lacquer coat. To obtain a satisfactory painted surface appearance, a total paint thickness of between 90 and 120 µm is generally applied, made up, for example, of a 20 to 30 µm thick cataphoretic coat, a 40 to 50 µm thick primer paint coat and a 30 to 40 µm base paint coat.

To limit the thickness of paint systems to less than 90 µm, certain motor vehicle manufacturers have proposed either to omit the cataphoresis step or else to limit the number of paint coats so as to increase productivity. However, at the present time, this thickness reduction of the paint system is always to the detriment of the final painted surface appearance of the part and is not implemented in industrial production.

This is because zinc-based coatings serving as base substrates have wavy surfaces, which can presently be compensated for only by thick coats of paint, otherwise the body parts would have an unacceptable "orange peel" appearance.

The waviness W of the surface is a gentle, pseudoperiodic, geometric irregularity of quite a long wavelength (0.8 to 10 mm), distinguished from the roughness R, which corresponds to geometric irregularities of short wavelengths (<0.8 mm).

SUMMARY OF THE INVENTION

In the present invention, the arithmetic mean Wa of the waviness profile, expressed in is used to characterize the surface waviness of the sheet, and the waviness measurements with a cut-off threshold of 0.8 mm are denoted by $Wa_{0.8}$.

An object of the invention is therefore to provide a process for manufacturing a metal strip coated with a corrosion-protection coating, the waviness $Wa_{0.8}$ of which is small compared with strip of the prior art, thus making it possible to manufacture painted metal parts requiring a total paint thickness small compared with parts of the prior art.

For this purpose, the present invention provides a process for manufacturing a metal strip having a metallic corrosion protection coating, comprising the steps of:

making the metal strip pass through a bath of molten metal comprising between 2 and 8 wt % aluminum, 0 to 5 wt % magnesium and up to 0.3 wt % addition elements, the balance being zinc and inevitable impurities, said bath being maintained at a temperature between 350 and 700° C.; then wiping the coated metal strip by means of nozzles spraying a gas on either side of the strip; and then cooling the coating in a controlled manner until it has completely solidified, said cooling being carried out at a rate less than 15° C./s between the temperature on leaving the wiping unit and the start of solidification and then at a rate greater than or equal to 15° C./s between the start and end of its solidification.

In preferred embodiments, the process according to the invention may further include the following features, taken individually or in combination:

the cooling is carried out at a rate of less than 10° C./s between the temperature on leaving the wiping unit and the start of solidification and then at a rate greater than or equal to 15° C./s between the start and the end of its solidification;

the cooling is carried out at a rate of less than 10° C./s between the temperature on leaving the wiping unit and the start of solidification, and then at a rate greater than or equal to 20° C./s between the start and end of its solidification;

the coated metal strip is wiped in such a way that the portion of the strip located between the wiping line and finishing at least 10 cm higher is in contact with an atmosphere having an oxidizing power lower than that of an atmosphere consisting of 4 vol % oxygen and 96 vol % nitrogen;

the metal strip is a steel strip.

Another subject of the invention is a cold-rolled metal strip hot-dip coated but not skin-passed, which can be obtained by the process according to the invention, the metallic coating of which comprises 2 to 8 wt % aluminum, 0 to 5 wt % magnesium and up to 0.3 wt % additional elements, the balance consisting of zinc and inevitable impurities, said coating having a waviness $Wa_{0.8}$ of 0.5 µm or less, preferably 0.45 µm or less.

In preferred embodiments, the metal strip according to the invention may further include the following features, taken individually or in combination:

the metal coating does not contain magnesium;
the metal coating contains 1 to 4 wt % magnesium;
the metal strip is made of steel.

Another subject of the invention is a metal part obtained by deformation of a non-skin-passed metal strip, the coating of which has a waviness $Wa_{0.8}$ of 0.48 µm or less, preferably 0.43 µm or less.

Yet another subject of the invention is a metal part obtained by deformation of a metal strip having furthermore undergone a skin-pass operation before deformation, the coating of which has a waviness $Wa_{0.8}$ of 0.35 µm or less, preferably 0.32, or even 0.31 or less.

DETAILED DESCRIPTION

The features and advantages of the present invention will become more clearly apparent over the course of the following description, given by way of non-limiting examples.

The first step of the process according to the invention consists in making a metal strip, such as a steel strip, pass continuously through a coating bath containing molten metal, contained in a crucible.

The strip run speed on industrial lines is generally between 40 m/min and 200 m/min, and is for example preferably greater than 120 m/min or even greater than 150 m/min.

The composition of the coating bath to be used in the process according to the invention is based on zinc and contains 2 to 8 wt % aluminum, which is therefore an essential element of the coating. The inventors have found that a coating comprising less than 2 wt % aluminum does not allow the process according to the invention to improve the waviness. Likewise, a coating comprising more than 8 wt % aluminum also fails to provide this desired effect according to the invention. This element also enables the corrosion resistance to be improved.

The bath may also contain up to 5 wt % magnesium so as to improve the corrosion resistance of the galvanized coating and in particular its red rust resistance. To obtain an appreciable effect on the corrosion resistance, it is preferable to add magnesium in an amount of at least 0.1 wt %, or 0.2 wt % and preferably at least 1 wt %. Its content in the bath is limited to 5 wt %, or even 4 wt %, since the coating obtained could have brittleness and adhesion problems during the subsequent forming operation in the case of higher contents. Furthermore, the inventors have found that the addition of this element does not compromise the results obtained on the waviness by the addition of aluminum.

The composition of the bath may also contain optionally addition elements, such as Si, Sb, Pb, Ti, Ca, Mn, Sn, La, Ce, Cr, Ni, Zr or Bi, in amounts up to 0.3 wt %. These various elements may make it possible, inter alia, to improve the corrosion resistance of the coating or else its brittleness or its adhesion, for example. A person skilled in the art knowing their effects on the characteristics of the coating would know how to use them depending on the desired additional objective. It has also been confirmed that these elements do not interfere with the way in which the waviness is controlled by the process according to the invention. In certain circumstances, it will however be preferable to limit the titanium content to less than 0.01%, or even less than 0.005%, since this element may cause contamination problems in the degreasing and phosphating baths used by automobile manufacturers.

Finally, the bath may contain inevitable impurities resulting from the crucible feed ingots or else from the strip passing through the bath. Thus, the bath may include especially iron, etc.

The bath is maintained at a temperature of between that of the liquidus +10° C. and 700° C., the temperature of the liquidus varying depending on its composition. For the range of coatings used in the present invention, this temperature will therefore be between 350 and 700° C. It will be recalled that the liquidus is the temperature above which an alloy is entirely in the molten state, the solidus being the temperature below which an alloy is entirely in the solidified state. For certain compositions, the temperature of the liquidus will be equal to that of the solidus.

After passing through the crucible, the metal strip coated on both its sides is then subjected to a wiping operation by means of nozzles placed on either side of the strip, which spray a gas, such as air or an inert gas, onto the surface of the strip. This convention operation, well known to those skilled in the art, enables the thickness of the coating, while it has not yet solidified, to be precisely adjusted.

After the wiping operation, the essential step of the process according to the invention is the controlled cooling of the coating until it has completely solidified.

Specifically, the present inventors have found that it is necessary to cool the coating differently before the start of solidification from that after solidification has started.

Thus, the cooling must be carried out at a rate of less than 15° C./s, preferably less than 10° C./s and more particularly preferably equal to or less than 5° C./s between the temperature on leaving the wiping unit and the start of solidification (i.e. when the coating just falls below the liquidus temperature, and then at a rate greater than or equal to 15° C./s, preferably greater than 20° C./s, between the start and end of its solidification (i.e. when the coating reaches the solidus temperature).

By respecting these settings, a surprising and significant improvement in the waviness of the coatings in question is observed, as the tests presented below demonstrate.

The cooling up to the start of solidification may be obtained by natural convection if it is desired to cool at a rate not exceeding about 5° C./s. Above this rate, it will generally be necessary to employ forced cooling using any suitable technical means, such as for example by blowing a cold gas.

Likewise, the cooling from the start of solidification will normally take place by forced cooling.

When the coated sheet has completely cooled, it may undergo a skin-pass operation, enabling it to be given a texture that facilitates its subsequent forming operations. Specifically, the skin-pass operation makes it possible to transfer roughness to the surface of the sheet sufficient for it to be formed properly, by promoting good retention of the oil applied to the sheet before it is formed.

This skin-pass operation is generally carried out on metal sheet intended for the manufacture of body parts for terrestrial motor vehicles. When the metal sheet according to the invention is intended for the manufacture of domestic electric appliances for example, this additional operation is not carried out.

The sheet, whether skin-passed or not, then undergoes a forming operation, for example by drawing, bending or profiling, preferably by drawing, so as to form a part that can then be painted. In the case of parts for domestic electric appliances, this paint coat may also optionally undergo an annealing operation using physical and/or chemical means known per se. For this purpose, the painted part can be passed through an induction or hot-air oven, or else beneath UV lamps or beneath an electron-beam scattering device.

For the production of a motor vehicle part, it is dipped in a cataphoresis bath and a primer paint coat, a base paint coat and optionally a top lacquer coat are applied in succession.

Before applying the cataphoretic coat to the part, the latter is firstly degreased and then phosphated so as to ensure adhesion of the cataphoresis treatment. The cataphoretic coat provides the part with additional corrosion protection. The primer paint coat, generally applied by a spray gun, prepares the final appearance of the part and protects it from chippings and from UV. The base paint coat gives the part its colour and its final appearance. The lacquer coat gives the surface of the part good mechanical strength, resistance to aggressive chemicals, and a good surface appearance.

The paint coat (or paint system) used to protect and guarantee the optimum surface appearance of galvanized parts has, for example, a 10 to 20 μm thick cataphoretic coat, a 30 μm primer paint undercoat and a 40 μm base paint undercoat.

In cases in which the paint system further includes a lacquer coat, the thicknesses of the various paint coats are generally the following:

cataphoretic coat: less than 10 to 20 μm;
primer paint coat: less than 20 μm;
base paint coat: less than 20 μm and advantageously less than 10 μm; and
lacquer coat: preferably less than 30 μm.

It is also possible for the paint system not to include a cataphoretic coat, and may comprise only a primer paint coat, a base paint coat and optionally a lacquer coat.

Moreover, complementary investigations have further improved the level of waviness of sheets and parts according to the invention by taking particular measures in the zone where the coating is wiped.

Specifically, the present inventors have found that by ensuring that the atmosphere in this zone has an oxidizing power less than that of an atmosphere consisting of 4 vol % oxygen and 96 vol % nitrogen, the level of waviness of sheet having been cooled according to the invention is further reduced.

The zone that has to be maintained at a low level of oxidation is at the minimum that starting immediately above the wiping line and stopping at least 10 cm higher and surrounding the running strip on both its sides. The term "wiping line" is understood here to mean the shortest segment connecting the nozzle to the sheet, corresponding to the minimum path followed by the wiping gas.

The oxidation level may be controlled in this way by any suitable means such as, for example, a consignment box covering the wiping zone and supplied with inert gas, such as nitrogen. It will also be possible to use, as wiping gas, an oxygen-depleted gas and not to supply particularly the box with inert gas, said box then being only supplied with the stream of wiping gas.

To determine the oxidizing power of the atmosphere surrounding the strip, its equivalent oxygen partial pressure at equilibrium is measured.

When the sole oxidizing gas present is $O_2$, mixed with an inert gas (nitrogen or argon), this pressure is then equal to the volume content of $O_2$ that can be measured in real time by means of a suitable sensor.

When other oxidizing gases, such as $H_2O$ or $CO_2$, are present mixed with a reducing gas, such as $H_2$ or $CO$ for example, the equivalent oxygen partial pressure is calculated by the law of mass action at the temperature of the gases in question.

For example, for the $H_2/H_2O$ pair, the reaction can be written as follows:

$$H_2 + \tfrac{1}{2}O_2 \leftrightarrow H_2O$$

In thermodynamic equilibrium, the partial pressures of the gases obey the following equation:

$$\frac{pH_2O}{pH_2 \times \sqrt{(pO)_2}} = e^{-\Delta G/RT}$$

where R is the perfect gas constant, T is the gas temperature in kelvin and $\Delta G$ is the change in free energy associated with the reaction, which may be found in thermodynamic tables, in calories per mole or in joules per mole depending on the value taken for the constant R.

The value of $pO_2$, i.e. the equivalent oxygen partial pressure at equilibrium, for the gas mixture in question is extracted from the above equation.

Within the context of the invention, $pO_2$ must be between 0.0015 and 0.04.

Moreover, it may be desirable to extend the optional confinement box as far as the surface of the bath or as far as an intermediate position between the bath and the wiping line so as to limit any oxidation before wiping. Specifically, when the surface of the sheet is exposed to the free air, such an oxidation layer automatically forms, but is most of the time removed and returned to the coating bath under the impact of the wiping jet. Such confinement therefore makes it possible to reduce the quantity of oxides of the bath, which oxides may be entrained by the strip as it runs therethrough and thus create unacceptable defects.

However, it has the drawback of promoting vaporization of zinc from the bath, which vapor may then foul the confinement box.

Although all kinds of wiping nozzles can be used to implement the process according to the invention it will be more particularly preferable to use nozzles having an orifice in the form of a sheet with a width exceeding that of the strip to be coated. This type of nozzle enables the bottom portion of the wiping zone to be properly confined.

Trials

Trials were carried out on a metal sheet made of cold-rolled interstitial-free titanium steel, which was made to pass through a crucible containing a zinc-based metal bath comprising variable proportions of aluminum and magnesium. The bath was maintained at a temperature of 70° C. below the liquidus of the composition.

On leaving the bath, the coating obtained was wiped with nitrogen by means of two conventional nozzles, so as to obtain a coating thickness of around 7 μm.

Placed above these wiping nozzles, on both sides of the strip, was a series of cooling boxes for blowing air in order to solidify the coating by forced convection. Depending on the flow rate, on the temperature of the blowing gas and on the number of boxes employed, the cooling rate could be adjusted between 5 and 50° C./s.

By varying these parameters and the position of the boxes employed, a series of trials was carried out so as to obtain controlled cooling at various cooling rates before the liquidus temperature was reached and between this temperature and the solidus temperature. When all the boxes were disconnected, the coating only underwent natural convection at a rate of about 5° C./s.

A trial (reference 17) was also carried out by wiping with nitrogen in a confined box with the oxygen content limited to 4 vol % in the zone starting level with the wiping line and finishing 10 cm higher.

Finally, the specimens obtained were drawn in a 3.5% equibiaxial (Marciniak) deformation mode. Some of the specimens were subjected beforehand to a skin-pass operation with an elongation of 1.5%.

As the trials proceed, waviness values $Wa_{0.8}$ are measured. This measurement consists in using a mechanical feeler gauge, without a runner, to obtain a profile of the sheet having a length of 50 mm, measured at 45° to the rolling direction. Subtracted from the signal obtained is the approximation of its general form by an at least 5th-order polynomial. The waviness Wa is then isolated from the roughness Ra by a Gaussian filter at the 0.8 mm cut-off threshold.

The results obtained are given in the following table:

| | Coating composition (wt %) | | | Liquidus-solidus (° C.) | CR before the liquidus (° C./s) | CR between liquidus and solidus (° C./s) | Waviness Wa$_{0.8}$ (μm) | | | |
|---|---|---|---|---|---|---|---|---|---|---|
| Trial | Zn | Al | Mg | | | | No skin-pass, no deformation | No skin-pass and after deformation | With skin-pass and before deformation | With skin-pass and after deformation |
| 1 | 93 | 4 | 3 | 357-340 | 5 | 5 | 1.21 | 1.08 | 0.42 | 0.87 |
| 2 | 93 | 4 | 3 | 357-340 | 5 | 10 | 0.92 | ne | ne | ne |
| 3* | 93 | 4 | 3 | 357-340 | 5 | 15 | 0.43 | ne | ne | ne |
| 4* | 93 | 4 | 3 | 357-340 | 5 | 20 | 0.39 | 0.34 | 0.32 | 0.30 |
| 5* | 93 | 4 | 3 | 357-340 | 10 | 20 | 0.47 | ne | ne | ne |
| 6 | 93 | 4 | 3 | 357-340 | 15 | 20 | 3.01 | ne | ne | ne |
| 7 | 99.7 | 0.3 | 0 | 416-413 | 5 | 20 | 0.71 | 0.62 | 0.41 | 0.63 |
| 8 | 97 | 1.5 | 1.5 | 380-340 | 5 | 20 | 0.84 | ne | ne | ne |
| 9 | 86 | 11 | 3 | 428-340 | 5 | 20 | 0.68 | ne | ne | ne |
| 10* | 95.5 | 3 | 1.5 | 369-340 | 5 | 20 | 0.42 | 0.39 | 0.34 | 0.33 |
| 11* | 91 | 6 | 3 | 371-340 | 5 | 20 | 0.43 | 0.40 | 0.35 | 0.32 |
| 12* | 98 | 2 | 0 | 401-381 | 5 | 20 | 0.48 | 0.46 | 0.36 | 0.35 |
| 13* | 95 | 5 | 0 | 381-381 | 5 | 20 | 0.43 | 0.39 | 0.35 | 0.34 |
| 14 | 95 | 5 | 0 | 381-381 | 15 | 20 | 3.36 | ne | ne | ne |
| 15 | 95 | 5 | 0 | 381-381 | 5 | 5 | 1.37 | 1.14 | 0.43 | 0.93 |
| 16* | 92 | 8 | 0 | 410-381 | 5 | 20 | 0.47 | 0.44 | 0.37 | 0.34 |
| 17* | 93 | 4 | 3 | 357-340 | 5 | 20 | 0.36 | 0.33 | 0.30 | 0.28 | ne: not evaluated;
*according to the invention;
CR: cooling rate.

Trials 1 to 3 show that, above a cooling rate during solidification of 15° C./s or higher, a spectacularly reduced waviness in the non-skin-passed state is obtained.

Moreover, the present inventors have found that too rapid a cooling rate in the first cooling phase, before reaching the liquidus, is also deleterious to the appearance of the coating, as trials 4 to 6 demonstrate, in which, when the 15° C./s threshold is exceeded, the waviness considerably worsens, passing from 0.47 to 3.01 μm when the cooling rate goes from 10 to 15° C./s.

It may therefore be stated that this first cooling step is also important for obtaining the desired surface appearance, leading to the conclusion that the entire cooling process must be controlled.

Trials 7 to 12 also show that the waviness levelling effect is not obtained for just any galvanized coating, but only for coatings having a composition that meets the ranges defined by the present invention.

Trials 4, 10 to 13 and 16 relating to skin-passed and drawn sheets indicate a surprising improvement in the level of waviness, whereas at the same time comparative trials 1, 7 and 15 show a degradation in the results obtained after drawing, preventing the waviness from falling below the 0.35 μm threshold for a part manufactured from a skin-passed sheet.

Finally, by comparing the results of trial 17 with those of trial 4, carried out under identical conditions but without the particular precaution as regards the wiping, a reduction in the level of waviness is observed in all the specific cases.

What is claimed is:

1. A process for manufacturing a coated metal strip comprising a metallic corrosion protection coating, the process comprising:
    passing a metal strip through a molten metal bath comprising from 2 to 8 wt % aluminum, 0 to 5 wt % magnesium and up to 0.3 wt % addition elements, a balance comprising zinc and inevitable impurity, to yield a molten metal coated metal strip;
    wiping the molten metal coated metal strip by spraying a gas on either side of the molten metal coated metal strip with a nozzle; and
    cooling the coating in a controlled manner until the coating has completely solidified, to obtain the coated metal strip,
    wherein
    a temperature of the molten metal bath is from 350 to 700° C.,
    the cooling is conducted at a rate less than 15° C./s from a temperature on leaving a unit where the wiping occurs and up to a start of solidification of the coating, and then at a rate greater than or equal to 15° C./s and lower than 50° C./s from the start of solidification of the coating until the coating reaches a solidus temperature.

2. The process of claim 1, wherein the cooling rate is less than 10° C./s from the temperature on leaving a unit where the wiping occurs and up to the start of solidification of the coating.

3. The process of claim 2, wherein the cooling rate is less than 10° C./s between a temperature on leaving a unit where the wiping unit occurs and a start of solidification of the coating, and then greater than or equal to 20° C./s between the start and end of solidification of the coating.

4. The process of claim 1, wherein the coated metal strip is wiped in such a way that a portion of the strip located between a shortest segment between the nozzle and the strip and at least 10 cm higher than the shortest segment is in contact with an atmosphere comprising an oxidizing power lower than that of an atmosphere consisting of 4 vol % oxygen and 96 vol % nitrogen.

5. The process of claim 1, wherein the metal strip is a steel strip.

6. The process of claim 1, wherein the molten metal bath comprises from 1 to 4 wt % of magnesium.

7. The process of claim 1, wherein the molten metal bath does not comprise any magnesium.

8. The process of claim 1, wherein a waviness Wa$_{0.8}$ of the coating, after solidification, is 0.5 μm or less.

9. The process of claim 8, further comprising a deformation of the metal strip to form a metal part, wherein a waviness $Wa_{0.8}$ of the coating of the metal part is 0.48 μum or less.

10. The process of claim 9, wherein the process does not comprise skin-passing the metal strip before deformation.

11. The process of claim 9, wherein the process comprises skin-passing the metal strip before deformation, and a waviness $Wa_{0.8}$ of the coating of the metal part is 0.35 μm or less.

12. The process of claim 9, according to which the deformation comprises a drawing of the metal strip.

13. The process of claim 1, wherein the cooling from the temperature on leaving a unit where the wiping occurs and up to the start of the solidification starts is performed by forced cooling.

14. The process of claim 1, wherein the cooling rate is of at least 10° C./s from the temperature on leaving the unit where the wiping occurs and up to the start of solidification of the coating.

15. The process of claim 1, wherein the cooling rate is greater than or equal to 15° C./s and of at most 20° C./s from the start of solidification of the coating until the coating reaches the solidus temperature.

16. The process of claim 1, wherein the addition elements are selected from the group consisting of Si, Sb, Pb, Ti, Ca, Mn, La, Ce, Cr, Ni, Zr and Bi.

\* \* \* \* \*